US006996806B2

(12) United States Patent  (10) Patent No.: US 6,996,806 B2
Bates et al.                (45) Date of Patent:     Feb. 7, 2006

(54) GRAPHICAL VIEW OF PROGRAM STRUCTURE DURING DEBUGGING SESSION

(75) Inventors: Cary Lee Bates, Rochester, MN (US); William Jon Schmidt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 808 days.

(21) Appl. No.: 09/956,901

(22) Filed: Sep. 21, 2001

(65) Prior Publication Data

US 2003/0061600 A1 Mar. 27, 2003

(51) Int. Cl.
    *G06F 9/44*     (2006.01)

(52) U.S. Cl. .................... 717/125; 717/124; 717/132
(58) Field of Classification Search ........ 717/124–129, 717/132, 133, 144, 155, 156, 157
See application file for complete search history.

(56) References Cited

U.S. PATENT DOCUMENTS

| | | | | | |
|---|---|---|---|---|---|
| 5,485,616 | A | * | 1/1996 | Burke et al. ................. | 717/133 |
| 5,535,394 | A | * | 7/1996 | Burke et al. ................. | 717/157 |
| 5,655,122 | A | * | 8/1997 | Wu ............................. | 717/152 |
| 5,732,273 | A | * | 3/1998 | Srivastava et al. .......... | 717/128 |
| 5,867,711 | A | * | 2/1999 | Subramanian et al. ...... | 717/161 |
| 5,999,737 | A | * | 12/1999 | Srivastava .................. | 717/162 |
| 6,003,143 | A | * | 12/1999 | Kim et al. .................... | 714/38 |
| 6,016,474 | A | * | 1/2000 | Kim et al. .................... | 717/125 |
| 6,026,241 | A | * | 2/2000 | Chow et al. ................. | 717/152 |
| 6,026,362 | A | * | 2/2000 | Kim et al. .................... | 705/1 |
| 6,173,276 | B1 | * | 1/2001 | Kant et al. .................... | 706/50 |
| 6,182,284 | B1 | * | 1/2001 | Sreedhar et al. ............. | 717/146 |
| 6,226,787 | B1 | * | 5/2001 | Serra et al. ................... | 717/125 |
| 6,275,981 | B1 | * | 8/2001 | Buzbee et al. ............... | 717/158 |
| 6,327,699 | B1 | * | 12/2001 | Larus et al. .................. | 717/128 |
| 6,631,518 | B1 | * | 10/2003 | Bortnikov et al. ........... | 717/158 |
| 6,651,247 | B1 | * | 11/2003 | Srinivasan ................... | 717/161 |

OTHER PUBLICATIONS

Praun et al, Static conflict analysis for multi–threaded object oriented programs, ACM PLDI, pp 115–128, Jun. 9–11, 2003.*
Tai et al, "Fault based est generation for causes effect graphs", ACM pp 495–504, Oct. 1993.*
Robschnik et al, "Efficient path conditions in dependence graphs", ACM ICSE, pp 478–488, May 19–25, 2002.*
Ingalls et al, "The implementation of tempral intervals in qualitative simulation graphs", ACM Trans. on Modeing and Computer Simulation, vol. 10, No. 3, pp 215–240, Jul. 2000.*

* cited by examiner

*Primary Examiner*—Anil Khatri
(74) *Attorney, Agent, or Firm*—Rabin & Berdo, P.C.

(57) ABSTRACT

In an exemplary aspect of the invention, a method for displaying a computer program organization on a screen monitor provides a graphical representation of a source code structure during a debugging session. The graphical representation may include a program call graph (PCG) or portion thereof for a procedure within the source code. The PCG may comprise a P_node to symbolize a procedure and an association reference to identify the relationship between two such procedures. Alternatively, the graphical representation may include a control flow graph (CFG) or portion thereof associated with a procedure within the source code. The procedure may comprise of one or more basic blocks, each basic block associated with a potentially executable source code statement. The CFG may comprise a B_node symbolizing a first basic block and an association reference to identify the relationship between two such basic blocks. The B_node may be adjusted by user command to display supplemental information (such as source code) or association with a cross-referencing table. In addition, the graphical representation may include a statement mapping table (SMT) or portion thereof associated with cross-referencing of line numbers and statements and basic blocks of a procedure within the source code.

31 Claims, 9 Drawing Sheets

```
120               122
  ↓                ↓
[ 1] main (int argc, char* argv[])
[ 2] {
[ 3]      int arg = 1;
[ 4]      int badfiles = 0;
[ 5]      while (arg < argc)
[ 6]      {
[ 7]           if (fileExists(argv[arg]))
[ 8]                processFile(argv[arg]);
[ 9]           else
[10]           {
[11]                badfiles++;
[12]                print ("Skipping non-existent file.");
[13]           }
[14]           arg++;
[15]      }
[16] }
```

FIG. 4

| STATEMENT | BASIC BLOCK | FIRST IN BLOCK |
|---|---|---|
| 1  | Start | yes |
| 2  | -     | --- |
| 3  | A     | yes |
| 4  | A     | no  |
| 5  | B     | yes |
| 6  | -     | --- |
| 7  | C     | yes |
| 8  | D     | yes |
| 9  | E     | yes |
| 10 | -     | --- |
| 11 | E     | no  |
| 12 | E     | no  |
| 13 | -     | --- |
| 14 | F     | yes |
| 15 | -     | --- |
| 16 | -     | --- |

GRAPHICAL VIEW OF PROGRAM STRUCTURE DURING DEBUGGING SESSION

BACKGROUND OF THE INVENTION

1. Field of the Invention

The present invention relates to graphical views of program structure during a debugging session. More particularly, the present invention relates to providing a graph for programming call or flow sequences on a visual display.

2. Background

A computer provides a multitude of services due to its structural ability to execute a set of instructions in different sequences. As computer architecture developed over the past half-century, instruction implementation has graduated from hard-wire connections to binary sequences to compilation of source code programs written in a high-level language (e.g., Fortran, C, Perl). Because syntax and logical errors may be introduced within a routine arising from human mistakes or oversight, programs must frequently be tested or otherwise evaluated to purge such "bugs" during software development. A computer programmer may use a debugger as a software tool to identify and correct these errors within a program source code.

High-level language source code incorporates human-recognizable symbolic characters for producing program instructions. These alpha-numeric and control characters in symbolic code (e.g., ASCII or American Standard Code for Information Interchange, EBCDIC and Unicode) correspond to binary sequences. The ASCII file may contain code structures, variable types and operational functions to be compared to the program's design intent by the programmer. A compiler translates the ASCII program file into an executable binary code for instruction execution by the computer.

Using a debugger, a programmer may sequentially "step" through the program code statements, while the corresponding machine instructions are being concurrently executed. While stepping through the code, a programmer may inter alia, monitor changes in selected diagnostic parameters to assist in discovering program flaws. While earlier historical epochs witnessed the necessity of line-printers to evaluate code, a modem programmer may read the code text and diagnostics on a screen monitor interactively with the statement sequencing.

Additionally, the programmer may also set a breakpoint at a specific program position with the debugger. During program execution, the debugger may interrupt execution when encountering a breakpoint and thereafter display selected program elements (e.g., software variables) to facilitate the debugging process. A debugger may also allow a programmer to define and set a conditional breakpoint to interrupt program execution if a condition evaluated at the breakpoint is satisfied (i.e., true).

Modular programming involves reducing a program into individual modules or procedures, each individually designed and tested. Such procedures can include subroutines and library functions called at particular locations in the program. A program may call a procedure in order to perform a particular task. Similarly, a procedure may be called by a program or another procedure (or recursively in some applications). The use of modular programming facilitates the production of a more concise logical structure, without disrupting the program organization by including routine instruction sets. Furthermore, a procedure can be replaced by another having the same functionality without disturbing the remainder of the source code.

Because modular programming has advantages for efficient program organization and maintenance, its incorporation has become a common practice in software design and many programming languages facilitate exploitation of this technique. However, as the modular design of a program becomes more complicated, the various interactions between program procedures may develop unwieldy patterns. Consequently, the programmer may engage in a difficult and time-consuming debugging session to validate the code to a modularly complex program.

A computer program may be visually represented by a graphical representation, e.g., a program call graph and a control flow graph. A program call graph or PCG may include a P_node associated with each programming procedure and its call relationship (e.g., to a main program or first procedure calling a second procedure or to a second procedure being called by the first procedure). A control flow graph or CFG may illustrate a plurality of basic blocks representing a procedure, each basic block denoted by a B_node.

Such graphs may be drawn by hand. Alternatively such a rendering may be produced using line-drawing software, such as the VCG (Visualization of Compiler Graphs) distributed under public license by GNU (GUI's Not Unix). However, these techniques require additional time and resources and may introduce additional interpretation discrepancies that necessitate further efforts to rectify without directly validating the software under evaluation.

Thus, an automatically generated graphical view of program structure during a debug session would be desirable for facilitating program debugging. Accordingly, there exists a need for an efficient, simple and inexpensive method for automatically rendering the logical and organizational structure of a program code in graphical format interactively on a screen monitor.

SUMMARY OF THE INVENTION

It is therefore, a principle object of this invention to provide a graphical view of program structure during a debugging session. It is another object of the invention to provide a graphical view of program structure during a debugging session that solves the above-mentioned problems. These and other objects of the present invention are accomplished by the graphical view of program structure during a debugging session disclosed herein.

In an exemplary aspect of the invention, a method for displaying a computer program organization on a screen monitor provides a graphical representation of a source code structure during a debugging session. The graphical representation may include a program call graph (PCG) or portion thereof for a procedure within the source code. The PCG may comprise a P_node to symbolize a procedure and an association reference to identify the relationship between two such procedures.

Alternatively, the graphical representation may include a control flow graph (CFG) or portion thereof associated with a procedure within the source code. The procedure may comprise one or more basic blocks, each basic block associated with a potentially executable source code statement. The CFG may comprise a B_node symbolizing a first basic block and an association reference to identify the relationship between two such basic blocks. The B_node may be adjusted by user command to display supplemental information (such as source code) or association with a cross-referencing table.

DETAILED DESCRIPTION OF THE PREFERRED EMBODIMENTS

The invention will now be described in more detail by way of example with reference to the embodiments shown in the accompanying figures. It should be kept in mind that the following described embodiments are only presented by way of example and should not be construed as limiting the inventive concept to any particular physical configuration. Further, if used and unless otherwise stated, the terms "upper", "lower", "front" (obverse), "back" (reverse), "over", "under" and similar such terms are not to be construed as limiting the invention to a particular orientation. Instead, these terms are used only on a relative basis.

Exemplary aspects of the present invention are described herein in the context of a graphical view of program structure during a debugging session. Those of ordinary skill in the art will realize that the following description of the present invention is illustrative only and not in any way limiting. Other aspects of the invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine figures of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, FPGAs (field programmable gate arrays), ASICs (application specific integrated circuits), or the like, may also be used without departing from the scope and spirit of the inventive concepts disclosed herein.

The present invention is directed towards a graphical representation of program structure that may be created on a screen monitor through the present invention during a debugging session. The process to produce the debug graphs may preferably be performed by software, although hardware as conceived of integrated circuits may alternatively provide the same functionality.

Detailed descriptions together with preferred and alternate embodiments render enabling information for the present invention. The illustrations in the accompanying figures are referenced infra in the following text. Persons having ordinary skill in the art are reminded that the following described embodiments are only presented by way of example and should not be construed as limiting the inventive concept to any particular physical configuration or order.

The environment of the present invention includes a computer system having a processor, an input device, a display device (e.g., screen monitor), and a memory having stored therein a debugger, a debug information data structure and a computer program, which cooperatively provide a debugging session of the computer program. The memory may include one or more types of storage, such as a RAM (random access memory), a disk, a cache, etc.

A method of providing a graphical diagnostic structure of a computer program during a debugging session may include displaying a particular graph (or portion thereof) associated with the procedures of the evaluated program. The image representing the structure may be rendered on the display device for benefit of the programming user. The image rendering commands may be supplied to the computer processor by the debugger. These graphs to be displayed may include a PCG (program call graph) and/or a CFG (control flow graph)

Figure 1:
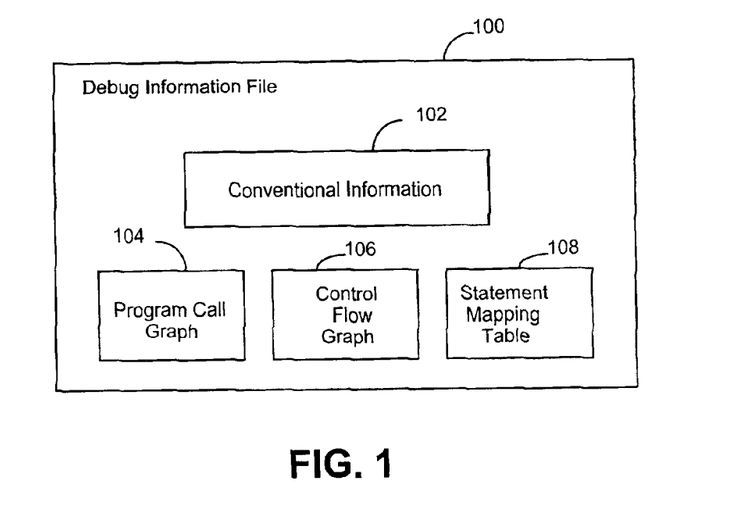
FIG. 1 is a block diagram of a debug information file in accordance with an exemplary aspect of the present invention.

The block diagram of FIG. 1 shows the debug information file 100 including conventional information 102 (considered available in applications previous to the present invention), PCG data 104, CFG data 106, and statement mapping data 108 in a statement mapping table. The nature of the debugger herein incorporates these data to facilitate the programmer with visual interactive tools. The debugger may display and manipulate a PCG and/or one or more CFGs during a debugging session.

The PCG data, CFG data and statement mapping data (discussed infra) may be generated by the debugger, the compiler, a program analyzer and/or a linker. In the preferred embodiment, data generation by the debugger may be avoided to reduce the execution initiation period of the debugger.

Figure 2:
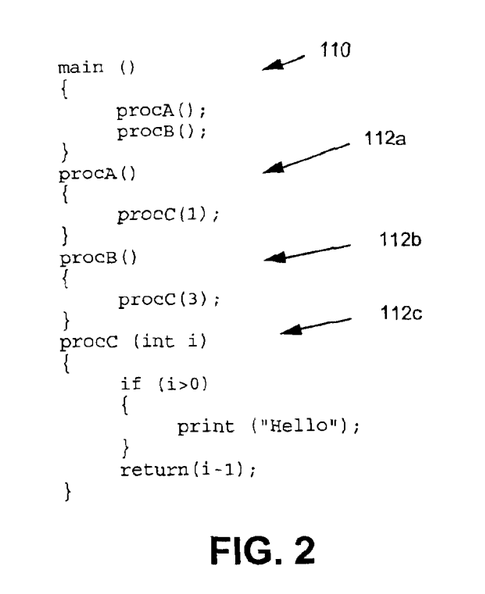
FIG. 2 is a textual diagram illustrating an example program source code.

The displayed PCG may comprise a P_node together with an illustrated relationship between a first procedure calling a second procedure and the second procedure being called. An exemplary computer program in FIGS. 2 and 3 features calling procedures and called procedures. FIG. 2 provides the source code (written in C) having a main procedure 110, a first subroutine procA 112a, a second subroutine procB 112b and a third subroutine procC 112c. A calling procedure (e.g., main, procA and procB) may call another procedure or itself (i.e., recursive), while a called procedure (e.g., procA, procB and procC) may be called by another procedure or itself. Procedure main 110 calls procA and procB, and both procA 112a and procB 112b call procC with a specified argument. In procC 112c, a print command issues, depending on the argument value.

Figure 3:
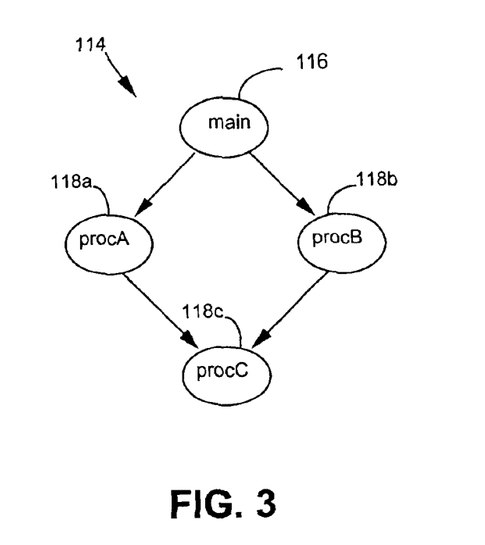
FIG. 3 is a block diagram illustrating a PCG in accordance with an exemplary aspect of the present invention.

FIG. 3 illustrates an exemplary PCG 114 corresponding to the FIG. 2 source code. The PCG may comprise a P_node for each procedure of the program, and a graphical indication (e.g., an arrow-line) of the call relationship between the procedures. The PCG 114 includes procedures main 116, procA 118a, procB 118b and procC 118c, each shown as a labeled, oval-shaped P_node. To denote the call relationships, arrows point from main 116 to procA 118a and to procB 118b, and from procA 118a and procB 118b each to procC 118c.

The oval shape selected for the P_node in FIG. 3 merely forms one graphical example. The P_node provides a visual representation of a procedure independent of geometric form. Alternatives may include a rectangle, an irregular shape, or other identifier (e.g., text label or icon) and may include one or more shades of color for display. The P_node shapes may also vary in size or aspect ratio for depicting nodes farther upstream or downstream in the procedure call hierarchy. The relationship indicator may denote P_node association by an arrow, or by alternative means such as a dashed line, curved line, double-line, etc. A program with a comparatively small number of P_nodes may be displayed as a complete PCG. Optionally, a portion of a PCG may be displayed due to screen area limitations or user preferences. Alternatively, the PCG portion may be expanded through user selection (e.g., pointer-click, menu item selection and/or scrolling).

Figure 4:
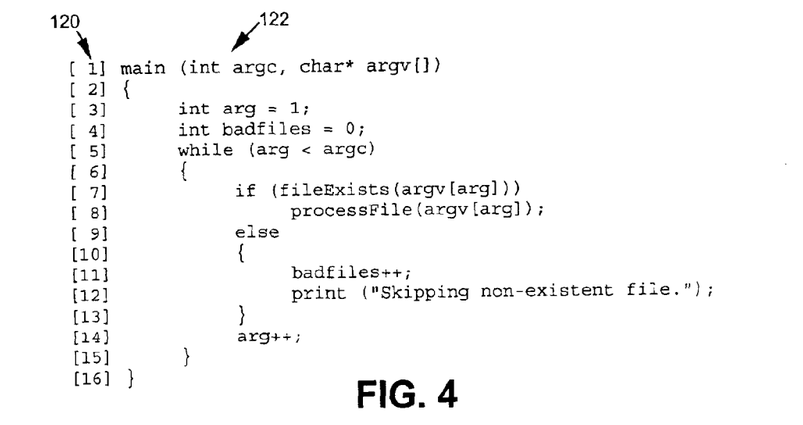
FIG. 4 is a textual diagram illustrating a series of line numbers and associated source code.
Figure 5:
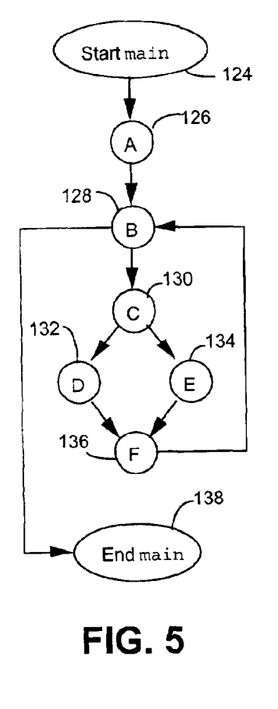
FIG. 5 is a block diagram illustrating a CFG in accordance with an exemplary aspect of the present invention.

During a debugging session, a program structure may be displayed as a CFG corresponding to a particular procedure of the program. FIG. 4 shows another exemplary source code (written in C) with line numbers 120 adjacent to the line statements 122. FIG. 5 illustrates an exemplary CFG corresponding to the procedure shown in FIG. 4 as source code. The CFG features a B_node associated with each basic block in the main procedure. The CFG also illustrates a visual indication relating each B_node to its previous and subsequent counterparts in the direction of execution order. A basic block symbolized by a B_node corresponds to one or more potentially executable statements. The executable statement must be entered only at the beginning of the sequence and must exit only at the end of the sequence. Statements within the basic block correspond may be translated to corresponding machine readable instructions that have been generated by a compiler. These instructions may then be executed by a processor. This execution can often result in unexpected program states occurring that may inhibit proper execution if not properly handled. Identifying such execution inhibitors for correction in the source code presents an intended feature of a debugger.

These B_nodes may be depicted as round (circular or oval) symbols and may optionally include a reference label or icon for identification. Each B_node may present a visual representation of at least one basic block, and may be portrayed by a variety of shapes. In FIG. 5, the B_nodes denote basic blocks beginning with main start 124 and sequentially followed by B_nodes labeled "A" 126 and "B" 128. The B_node "B" 128 may be followed by B_node "C" 130 that bifurcates to B_nodes either "D" 132 or "E" 134 before proceeding to B_node "F" 136. Alternatively, B_node "B" 128 may proceed to the main end 138. The operational order of basic block execution may be shown by arrow lines connecting between the B_nodes, or by alternate visual forms of association. A header entry as start 124 and an exit as end 138 may serve to uniquely identify the procedure constituting the basic blocks represented by the B_nodes.

Figure 6:
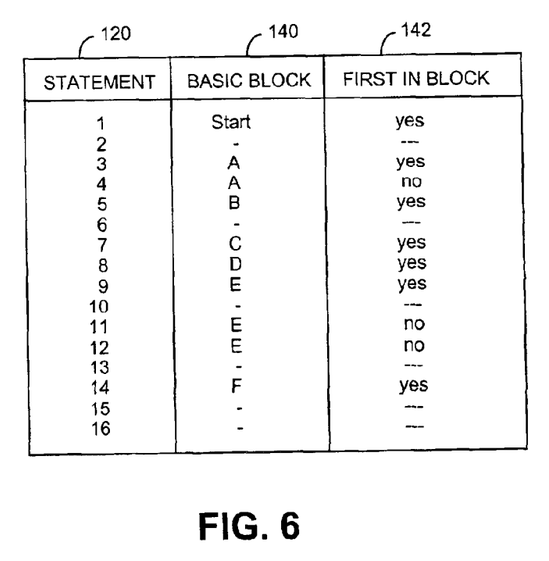
FIG. 6 is a tabular diagram illustrating portions of a statement mapping table in a debug information file in accordance with an exemplary aspect of the present invention.

The CFG may optionally use a mapping table 108 to cross-reference the line numbers associated with each P_node label. FIG. 6 shows a bordered statement mapping table having a statement column with line numbers 120, a basic block column 140 with labels corresponding to each B_node, and a first-in-block column 142 with a logical index corresponding to each line of code regarding its sequential preeminence within its basic block. For example, B_node "A" 126 corresponds to line numbers [3] and [4] executed in sequence. This basic block begins with line [3] followed by line [4]. Consequently, the logical query in the first-in-block column 142 holds valid (i.e., "yes") for line [3] but not (i.e., "no") for line [4]. Accordingly, the debugger may use a statement mapping data structure for each procedure for referencing source codes statements and line numbers of the program.

Figure 7:
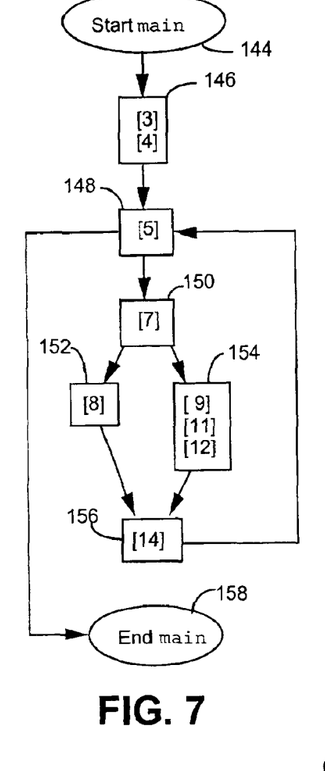
FIGS. 7 through 10 are block diagrams illustrating a CFG in accordance with an exemplary aspect of the present invention.

FIG. 7 provides another version of the CFG. The round symbols with alphabetical labels denoting each B_node in FIG. 5 may be replaced by rectangular forms listing line numbers within each basic block. The substitution in shape may distinguish line number lists from symbolic labels in a B_node. Each B_node may include one or more line number containing a source code statement to be executed. (Line numbers for statements that comprise opening or closing syntax may be omitted to reduce clutter.) Following the main start 144, the B_nodes 146, 148, 150, 152, 154 and 156 may be executed in an order shown by the arrows and terminating at the main end 158. These items correspond to FIG. 5 counterparts 124, 126, 128, 130, 132, 134, 136 and 138 respectively. For example, the B_node 146 for lines [3] [4] corresponds to B_node "A" 126.

Figure 8:
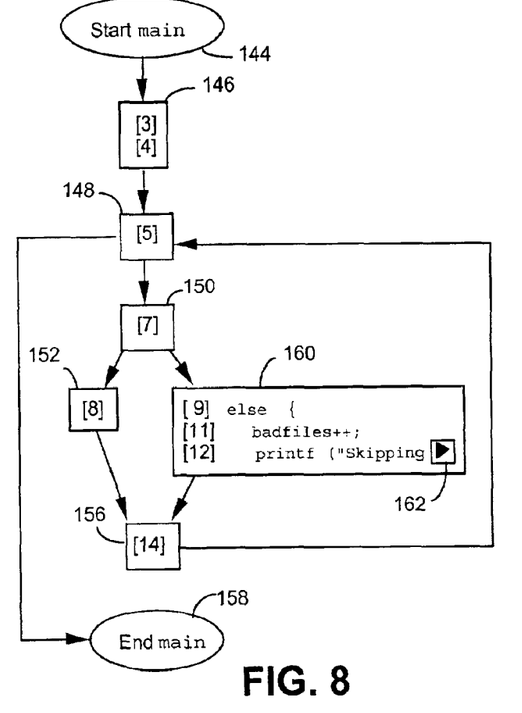

A B_node can be partly or fully expanded to display the source code statement corresponding to the line numbers therein. A menu selection or other command may expand the statements for a B_node, thereby enlarging its represented form. The B_node 154 identifying lines [9] [11] [12] may be replaced in FIG. 8 by B_node 160 featuring the statement associated with each line number. A button 162 featuring a right-pointing triangle on line [12] may denote a statement truncation. A pointer-click at the button 162 may expand the statement in order to view the entire code text for the associated line number.

Figure 9:
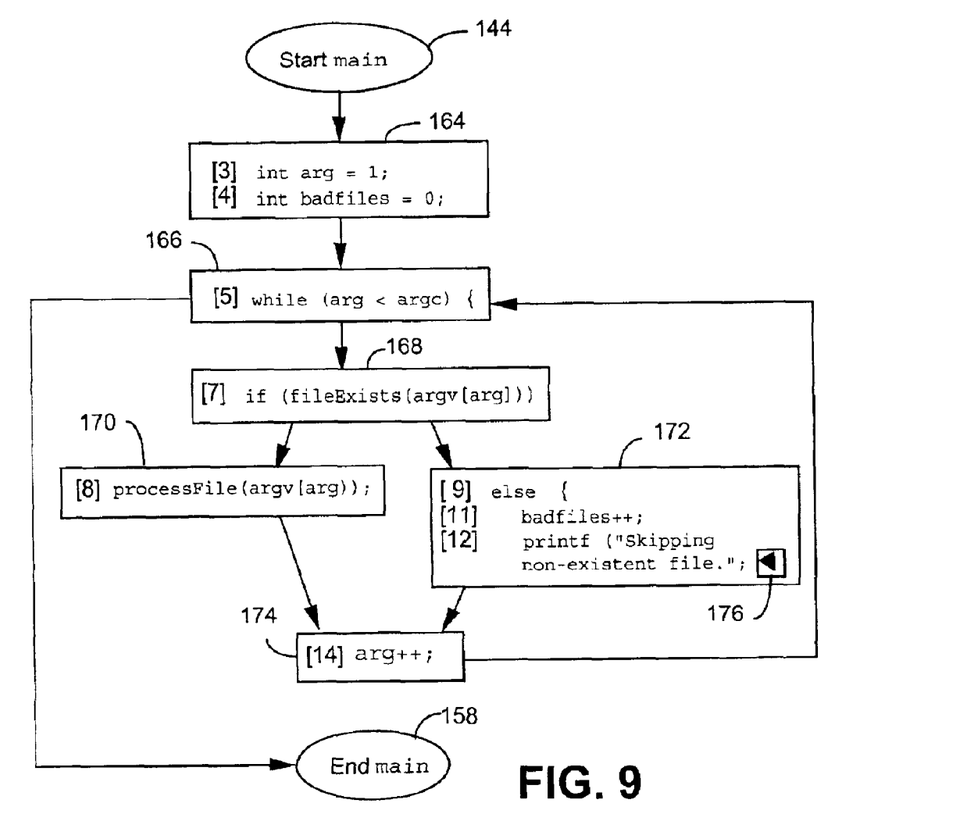
Figure 10:
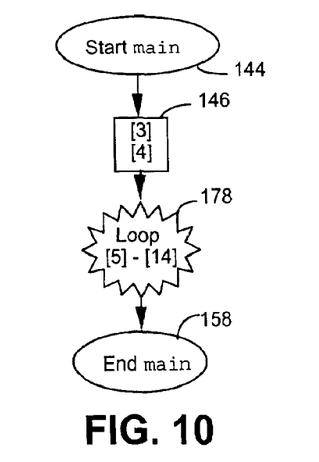

A menu selection or other command may expand the statements for all B_nodes displayed or alternatively for a collection of B_nodes by menu selection, cursor-drag-window or such means. FIG. 9 expands the B_nodes to include the source code associated with each line number. The expanded B_nodes 164, 166, 168, 170, 172 and 174 in FIG. 9 correspond to B_nodes 146, 148, 150, 152, 154 and 156 respectively from FIG. 7 discussed supra. The B_node 172 for lines [9] [11] [12] show the full text of the statements, with a button 176 featuring a left-pointing triangle on line [12]. By selecting the button 176, the text of line [12] may be partially collapsed for reducing CFG screen area. Alternatively, the CFG may be simplified by consolidating several nodes into a smaller quantity of looping symbols. In FIG. 10, the B_nodes 148, 150, 152, 154 and 156 from FIG. 7 have been collapsed into a single starburst B_node 178 denoting a loop for lines [5] through [14]. The particular shapes selected for these CFG representations are illustrative only and should not be construed as limiting of the innovative aspects of the present invention.

Figure 11:
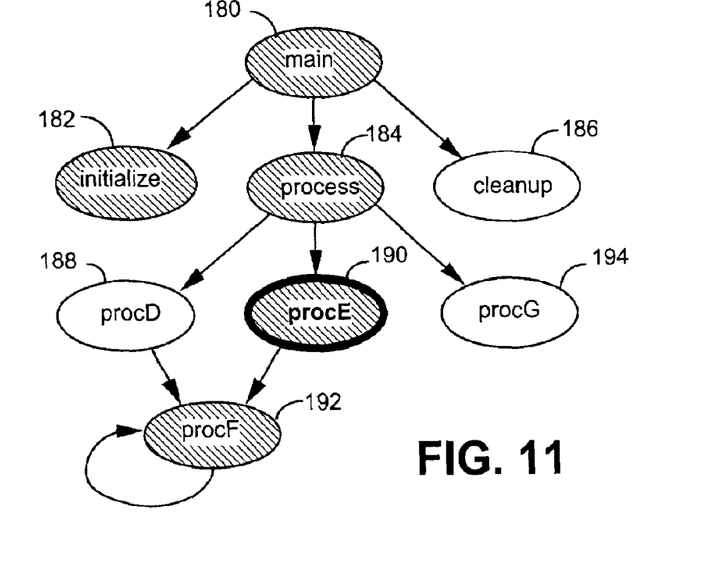
FIG. 11 is a block diagram illustrating a PCG in accordance with an exemplary aspect of the present invention.

Another aspect of the present invention concerns visually distinguishing P_nodes and B_nodes whose statements have been executed from those whose statements have not executed at a particular stage within the debugging session. In this manner, a user can readily discern between executed and non-executed portions of code within an executing procedure. An example of a PCG in FIG. 11 illustrates this feature for highlighting particular P_nodes. The PCG includes a main procedure 180 that calls procedures to initialize 182, process 184 and cleanup 186. From process 184, additional procedures procD 188, procE 190, procF 192 and procG 194 may be called, although procF 192 may be called through procD 188, procE 190 or itself, recursively.

In FIG. 11, the labeled P_nodes representing procedures main 180, initialize 182, process 184, procE 190 and procF 192 are filled with hash-marks indicating these procedures have been at least partially executed at the displayed stage in the debugging session. The hash-marks represent only an example method of distinguishing an executed P_node from a non-executed one. On a screen monitor, an alternate color to fill the shape or other highlighting means may be used to denote a particular P_node. The currently executing procedure may be identified as the P_node representing procE 190 by the thickened or darkened outline around the shape border. On a screen monitor, a lighter shade or different color might alternatively be used to perform this distinction.

Figure 12:
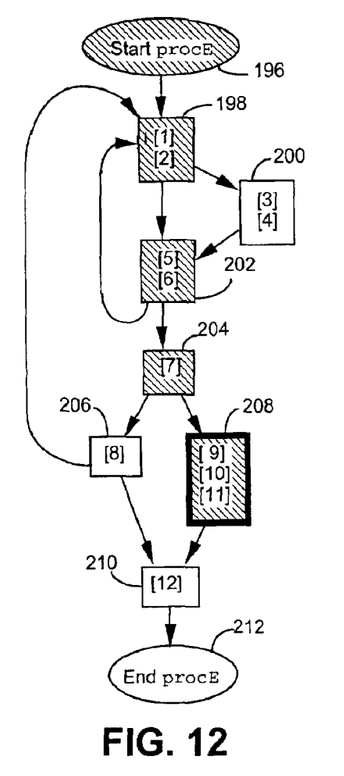
FIG. 12 is a block diagram illustrating a CFG in accordance with an exemplary aspect of the present invention.

A complementary example of a CFG in FIG. 12 illustrates the distinction between executed and non-executed basic blocks. The P_node procedure denoted as procE 190 may be described in a schematic by a series of B_nodes. Following the procE start 196, the B_nodes 198, 200, 202, 204, 206, 208 and 210 may be executed in the sequence shown by arrows, terminating with procE end 212. The line numbers associated with each B_node may be labeled within its denoting form. The B_nodes 196, 198, 202, 204 and 208 already executed at the displayed stage in the debugging session are filled with hash-marks, as compared to their non-highlighted counterparts. A further distinction for a B_node 208 being currently executed may feature a thicker or darker or brighter outline around its shape border than other B_nodes. Execution frequency of a particular B_node may also be denoted by a symbol flag, pulsing border at a visually observable frequency or similar means. Such means may also be employed for an expanded version of a B_node or a collapsed icon for a loop. These particular illustrated examples of distinguishing executed from non-executed basic blocks should not be construed as limiting.

Figure 13:
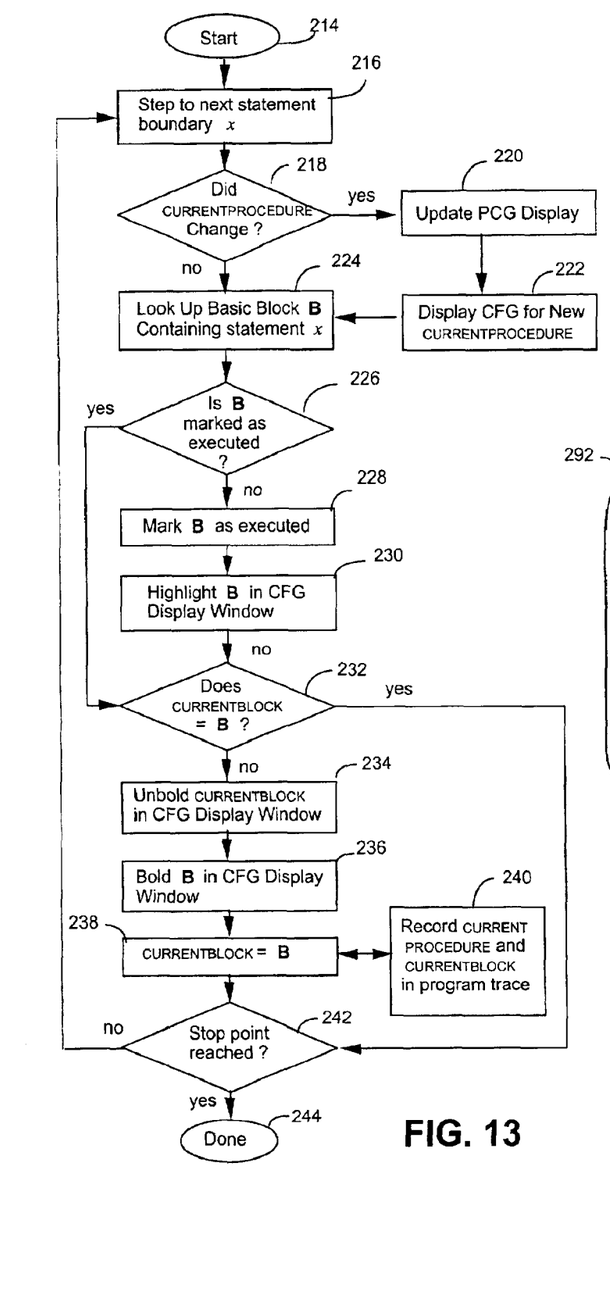
FIG. 13 is a flowchart diagram illustrating a debug display updating routine in accordance with an exemplary aspect of the present invention.

A method for updating a display during a debugging session of a PCG or a CFG can be shown in FIG. 13 as a flowchart for the update routine. The instructions therein may be invoked while a program is being debugged by a step-through process, execution to a breakpoint, or execution to termination. After start 214, the update routine steps 216 to a statement boundary denoted by x that occurs within a selected procedure P represented by a P_node. A logical change query 218 determines whether the current procedure has changed from a prior call of the update routine. If so, the PCG may be updated 220 followed by an instruction to display the CFG 222 for the new current procedure. Given a statement x (from a search input), the update routine proceeds to a search 224 for a basic block B represented by a B_node (and within procedure P) containing statement x after the display 222 or if the query 218 shows no change. The search may be performed using the statement mapping data.

A logical mark query 226 determines whether basic block B has been marked as executed. If not, the basic block B is so marked 228 and highlighted 230 in the CFG display. If so, or after highlighting, a logical equivalence query 232 determines whether the current block and basic block B are synonymous. If not, the CFG display is altered to unbold the designated current block 234, bold basic block B 236 and reset current block to equal basic block B 238. Optionally, the current procedure and current block may be recorded 240 in a program trace. Following the reset 238 or if equivalence query 232 holds valid, a logical stop query 242 determines whether to terminate the routine. If so, the update routine is terminated 244 and if not, the update routine returns to statement step 216.

An advantage of recording 240 a current procedure and current block in memory as a retrievable program trace may constitute an ability to visually retrace the execution steps of the code being debugged without a potentially cumbersome repeat of compilation and/or execution. In addition, the program trace may be employed in documentation as an explanatory device.

Figure 14:
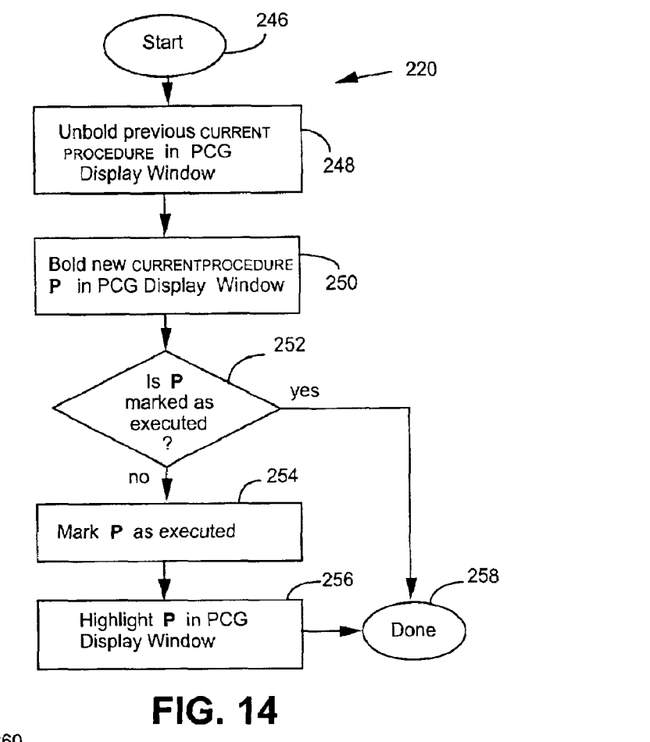
FIG. 14 is a flowchart diagram illustrating a called PCG updating routine in accordance with an exemplary aspect of the present invention.

The call to update the PCG 220 for a procedure P may be further described by the FIG. 14 flowchart. After start 246, the update routine may unbold 248 the previous current procedure and bold 250 the new current procedure P in the PCG display. A logical mark query 252 determines if current procedure P is marked as executed. If not, the current procedure P is so marked 254 and highlighted 256 in the PCG display. If so, or after highlighting 256, the routine 220 terminates 258 and returns to resume FIG. 13 instructions.

Figure 15:
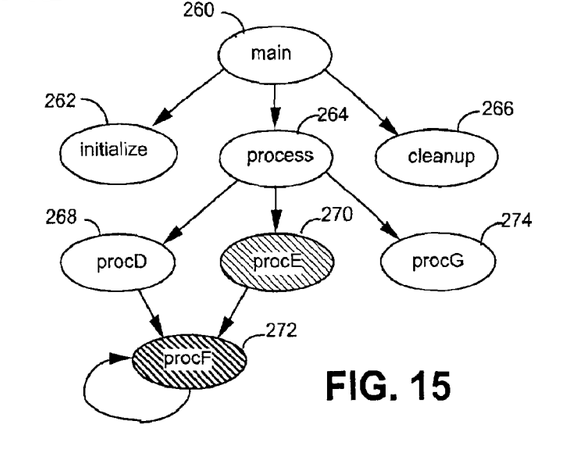
FIG. 15 is a block diagram illustrating a PCG in accordance with an exemplary aspect of the present invention.

Highlighting of a selected P_node in a PCG may serve an alternate purpose. A procedure that has been executed more frequently or more recently than others may be distinguished by its representing P_node being displayed in a different shade than adjacent P_nodes. The basis of comparison may use an heuristic threshold (e.g., based on a ratio of procedure calls) or an absolute measure. An example of a PCG in FIG. 15 illustrates this feature for highlighting P_nodes on a frequency hierarchy. The PCG includes a main procedure 260 that may call procedures to initialize 262, process 264 and cleanup 266. From process 264, additional procedures procD 268, procE 270, procF 272 and procG 274 may be called. The P_nodes representing procE 270 and procF 272 may be highlighted in FIG. 15 by hash-mark shading. On a screen monitor however, highlighting may be denoted by alterations in color shading or intensity, without departing from the scope of the present invention. Due to recursive calling, procF 272 may be shown as darker (or more intense) than procE 270 to indicate more frequent and/or recent execution.

Figure 16:
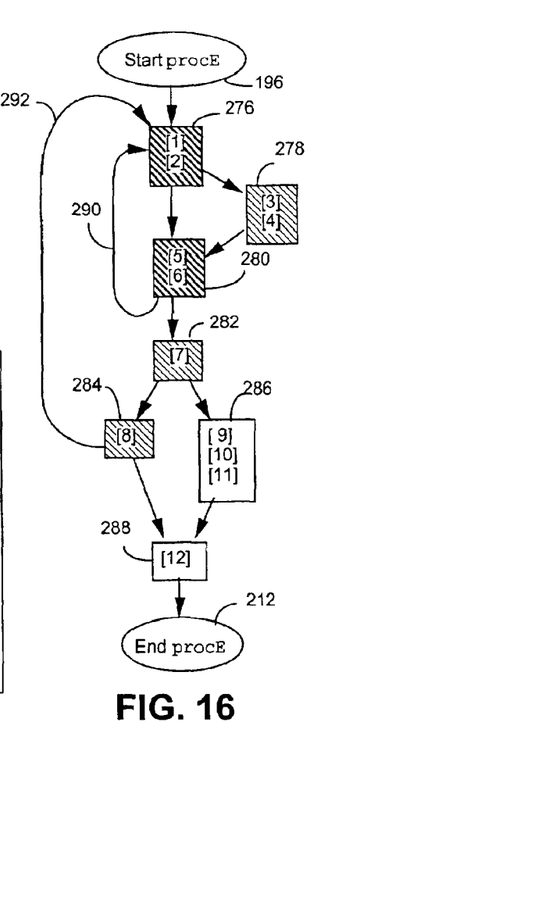
FIG. 16 is a block diagram illustrating a CFG in accordance with an exemplary aspect of the present invention.

Similarly a selected B_node in a CFG may be highlighted as in FIG. 16 for indicating more frequent or recent execution of a represented basic block. Using exemplary line numbers to represent source code from procedure procE 270, the process begins at start 196 and proceeds to a nested operation loop with the B_nodes 276, 278, 280, 282 and 284, as well as 286 and 288. These basic blocks may be executed in the sequence shown by arrows, including an inner loop 290 and an outer loop 292, terminating with procE end 212. The line numbers associated with each B_node may be labeled within its denoting form. The B_nodes 276 and 280 included in the inner loop 290 may be shown by darker hash-mark shading than for B_nodes 278, 282 and 284 within the outer loop 292. The inner loop 290 also includes B_node 278, but is shown in lighter shade as a consequence of being less frequently called. Such visual distinction may indicate more frequent execution of the basic blocks within inner loop 290 than those in the outer loop 292. Execution frequency of a particular B_node may also be denoted by a symbol flag or a pulsing border at a visually observable frequency, or by a similar means.

Figures 17, 19:
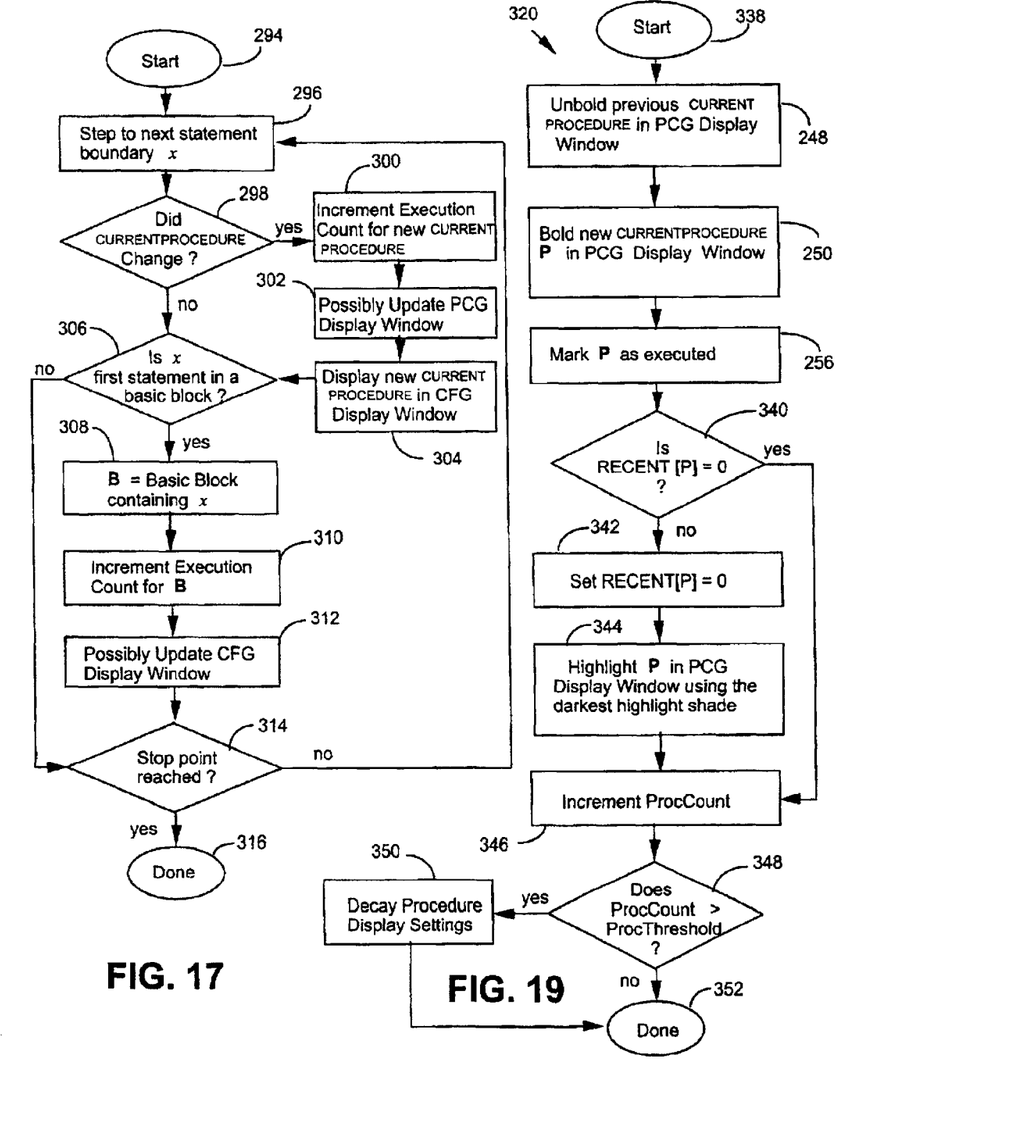
FIGS. 17 and 18 are flowchart diagrams illustrating a debug display updating routine in accordance with an exemplary aspect of the present invention.
FIG. 19 is a flowchart diagram illustrating a called PCG updating routine in accordance with an exemplary aspect of the present invention.

A method for updating a display during a debugging session of a PCG or a CFG can be shown in FIG. 17 as a flowchart for the update routine. The instructions therein may be invoked while a program is being debugged by a step-through process, execution to a breakpoint, or execution to termination. After start 294, the update routine steps 296 to statement boundary denoted by x. A logical change query 298 determines whether the current procedure has changed from a prior call of the update routine. If so, a counter for the PCG may be incremented 300 followed by an instruction to possibly display the PCG 302 for the new current procedure. The basis for PCG display may be based on heuristic criteria.

The following instruction displays the CFG 304 for the new current procedure. If no change is indicated in query 298 or following the CFG display 304, a logical first statement query 306 may be ascertained to determine whether statement x is primary (i.e., first) within a basic block. If so, then basic block B may be identified 308 as containing statement x. The execution count may be incremented 310 followed by a possible CFG display update 312 (on an heuristic basis). If statement x is not primary within B in query 306 or following CFG update 312, a logical stop query 314 may determine whether to return to stepping to the next statement 296 or to terminate 316.

Figure 18:
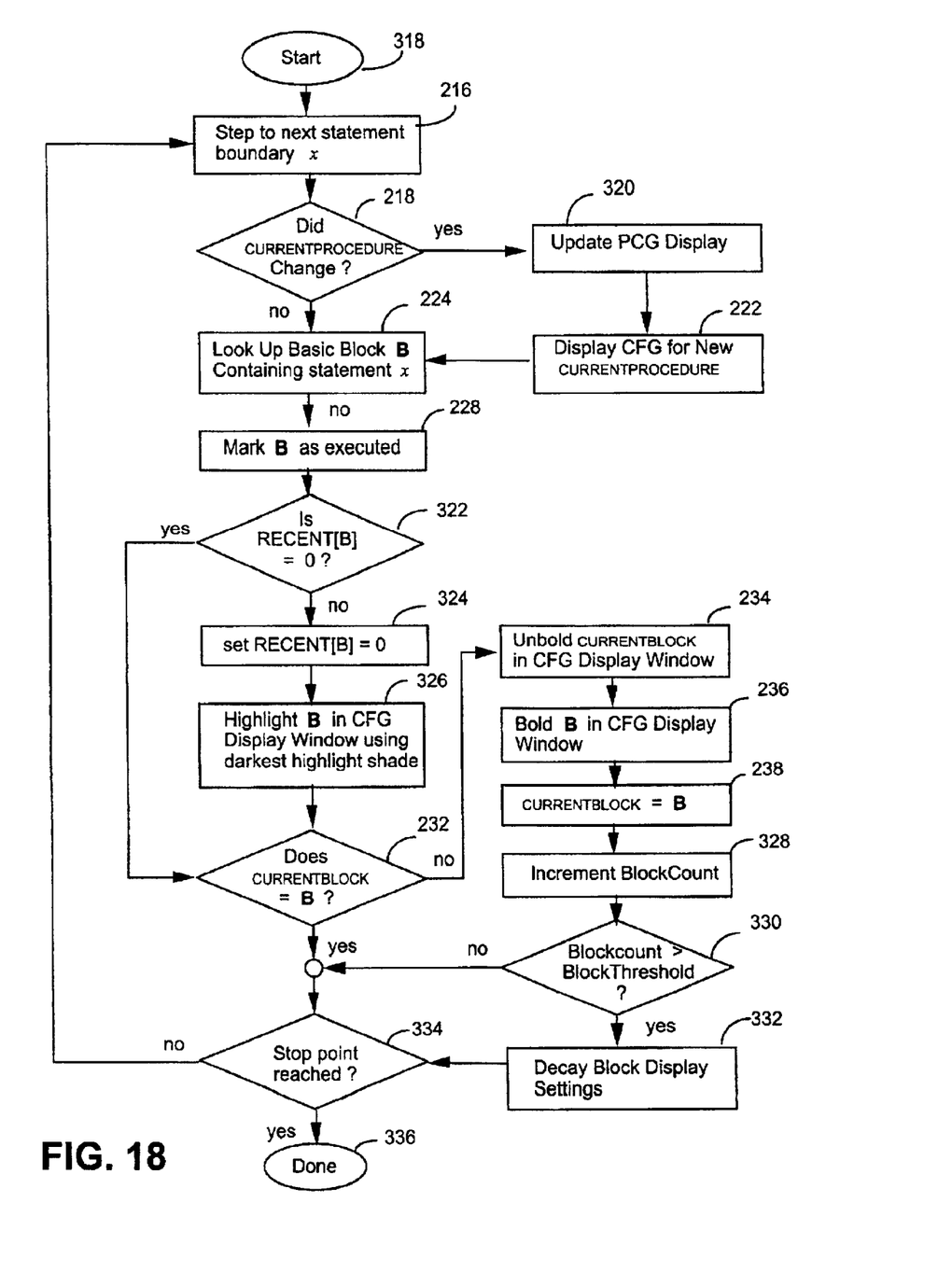

A modified version of the method described in FIG. 13 may be shown in the FIG. 18 flowchart to include a decay function for highlighting recently executed basic blocks and unhighlighting basic blocks after an interval of dormancy. After start 318, the update routine steps 216 to statement boundary denoted by x (from a search input). A logical change query 218 determines whether the current procedure has changed from a prior call of the update routine. If so, the PCG may be updated 320 followed by an instruction to display the CFG 222 for the new current procedure. The update routine proceeds to a search 224 in basic block B containing statement x after the display 222 or if the query 218 shows no change. In this manner, the basic block B containing statement x can be identified. Subsequently, basic block B may be marked 228 as executed.

A logical recent query 322 determines whether a parameter RECENT[B] equals zero. This value may represent an incremented value for an immediately or recently preceded execution. If not, this parameter RECENT[B] for basic block B may be set to zero 324, followed by a highlight 326 of the B_node for basic block B in the CFG using the darkest (or most intense) indicative shade. (Alternatively, the brightest shade may be used for display purposes to distinguish from other B_nodes.) Subsequently, or if RECENT[B] equals zero, a logical equivalence query 232 determines whether the current block and basic block B are synonymous. If not, the CFG display is altered to unbold the designated current block 234, bold basic block B 236 and reset current block to equal basic block B 238. The block count 328 may be incremented and a logical threshold query 330 determines whether the block count exceeds the block threshold. If so, the block display may exhibit a decaying imagery signal 332, such as a lighter (or less intense) indicative shade relative to the most current or most frequent basic block. If not, or if current block equals basic block B in query 232, a logical stop query 334 determines whether to return to statement stepping 216 or to terminate 336.

Figures 20, 21:
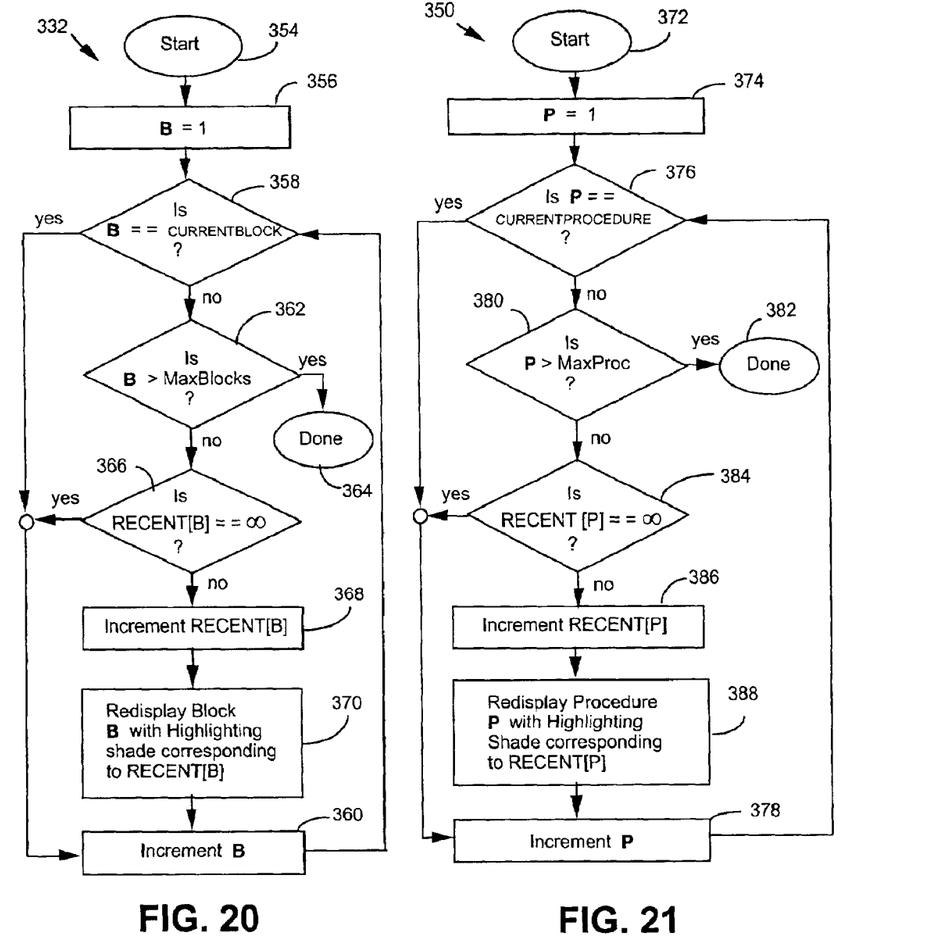
FIG. 20 is a flowchart diagram illustrating a called CFG updating routine in accordance with an exemplary aspect of the present invention.
FIG. 21 is a flowchart diagram illustrating a called PCG updating routine in accordance with an exemplary aspect of the present invention.

Complementing FIG. 18 to update the debugging display 320 are is the FIGS. 19 flowchart and 20 for updating the PCG and CFG respectively. After start 338 in FIG. 19, the update routine unbolds the previous current procedure 248 and bolds the new current procedure P 250 in the PCG. After marking 256 the current procedure P as being executed, a logical recent query 340 determines whether a parameter RECENT[P] equals zero. If not, this parameter for procedure P may be set to zero 342, followed by a highlight 344 of the P_node for procedure P in the PCG using an indicative shade contrasting with adjacent nodes. Subsequently, or if parameter RECENT[P] equals zero, a procedure count may be incremented 346. A logical threshold query 348 then may determine whether the procedure count exceeds a procedure threshold. If so, the procedure display may exhibit a decaying imagery signal 350. If not, or if the procedure count does not exceed the procedure threshold, the routine may terminate 352 and return to PCG update call 320 in FIG. 18.

The B_node decay call 332 in FIG. 18 may be expanded in the FIG. 20 flowchart for greater detail. After start 354, the decay call may set the basic block B equal to unity 356. A logical change query 358 determines whether basic block B equals the current block. If so, the basic block B may be incremented 360 (increasing to an integer value exceeding unity). If not, a logical maximum query 362 determines whether basic block B exceeds the maximum number of basic blocks in the current procedure. If so, the routine may terminate 364 returning to the decay block call 332 in FIG. 18, and if not, a logical recent query 366 determines whether parameter RECENT[B] equals its maximum allowable value (represented as infinity in the flowchart). If so, the basic block B may be incremented 360, and if not the parameter RECENT[B] may be incremented 368. The basic block B may be redisplayed 370 with highlighting shade corresponding to the RECENT[B] value (e.g., more intense for a B_node symbolizing a more recently called basic block, or less intense for a B_node depicting a less actively called basic block).

Similarly the FIG. 21 flowchart exhibits greater detail for the P_node decay call 350 from FIG. 18. After start 372, the procedure P may be set equal to unity 374 and a logical equivalence query 376 determines if procedure P and the current procedure are synonymous. If so, procedure P may be incremented 378 and return to the query 376. If not, a logical maximum query 380 may establish whether procedure P has exceeded the maximum procedure within the code. If so, the routine may terminate 382 and return to decay call 350 in FIG. 18. If not, a logical recent query 384 determines whether parameter RECENT[P] equals its maximum allowable value (represented as infinity in the flowchart). If so, then procedure P may be incremented 378 but if not, then parameter RECENT[P] may be incremented 386 to indicate the relative period of inactivity for procedure P. The P__node representing procedure P may be redisplayed 388 with a highlighting shade to correspond with the value of parameter RECENT[P] (e.g., more intense for a P__node symbolizing more recently called procedure, or less intense for a P__node depicting a less actively called procedure). The procedure P may be incremented 378 before resuming to query 376.

Each of the above aspects may be embodied in a method, a debugger and an article of manufacture comprising a computer readable program storage medium tangibly embodying one or more programs of instruction executable by a computer to perform the method.

The instructions described coupled with illustrations of the graphs displaying a code structure being debugged, both supra, enables the person of ordinary skill in the art to render such graphical tools by computer generated process and display the relevant information on a screen monitor. In spite of the specific examples depicted, however, it should be understood that the invention is not necessarily limited to the specific process, arrangement, materials and components shown and described above, but may be susceptible to numerous variations within the scope of the invention. It will be apparent to one skilled in the art that the manner of making and using the claimed invention has been adequately disclosed in the above-written description of the preferred embodiments taken together with the drawings. The above description of the preferred embodiments of the present invention is susceptible to various modifications, changes and adaptations, and these same are intended to be comprehended within the meaning and range of equivalents of the appended claims.

The programming techniques for generating the graphical representations presented herein may be considered well known in the art and available by common software tools. While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for displaying a structural view of a computer program on a monitor during a debugging session, said method applying within a computer system, said method comprising:
   displaying a portion of a program call graph (PCG) on the monitor, wherein said PCG includes a P__node symbolically representing a first procedure and a procedure relationship symbolically representing a calling association from said first procedure to a second procedure;
   determining a condition for said first procedure while executing the computer program; and
   updating the display on the monitor to mark said P__node on said condition into a marked P__node, wherein said marked P__node is visually distinguishable from said P__node.

2. The method of claim 1, wherein said condition is taken from the group consisting of an execution state, an execution frequency and an execution age, wherein said execution state corresponds to either said first procedure having been executed or said first procedure being nonexecuted, wherein said execution frequency is a rate of said first procedure being executed, and wherein said execution age is a time interval since said first procedure has been executed.

3. The method of claim 1, wherein said marked P__node has an altered symbolic attribute from an unaltered P__node, wherein said symbolic attribute is taken from the group consisting of shade, highlight, color, border thickness, symbol size, symbol shape, and alternation of a visual characteristic.

4. The method of claim 1, further comprising:
   creating a list of a plurality of PCG procedures from said portion of said PCG; and
   recording said list of said plurality of PCG procedures onto a memory, said memory being retrievable.

5. A method for displaying a structural view of a computer program on a monitor during a debugging session, said method applying within a computer system, said method comprising:
   displaying a portion of a control flow graph (CFG) on the monitor, wherein said CFG includes a B__node symbolically representing a first basic block and a basic block relationship symbolically representing a calling association from said first basic block to a second basic block;
   determining a condition for said first basic block while executing the computer program; and
   updating the display on said monitor to mark said B__node based on said condition into a marked B__node, wherein said marked B__node is visually distinguishable from said B__node.

6. The method of claim 5, further comprising:
   displaying within said B__node a line number associated with a source code statement of the computer program.

7. The method of claim 6, further comprising:
   displaying within said B__node a portion of said source code statement.

8. The method of claim 7, wherein said portion of said source code statement can be alternately toggled for one of either displaying said source code statement or displaying said portion of said source code statement.

9. The method of claim 5, wherein said condition is taken from the group consisting of an execution state, an execution frequency and an execution age, wherein said execution state corresponds to either said first procedure having been executed or said first procedure being nonexecuted, wherein said execution frequency is a rate of said first procedure being executed, and wherein said execution age is a time interval since said first procedure has been executed.

10. The method of claim 5, wherein said marked B__node has an altered symbolic attribute from an unaltered B__node, wherein said symbolic attribute is taken from the group consisting of shade, highlight, color, border thickness, symbol size, symbol shape, and alternation of a visual characteristic.

11. The method of claim 5, further comprising:
    creating a list of a plurality of CFG instructions from said portion of said CFG; and
    recording said list of said plurality of CFG instructions onto a memory, said memory being retrievable.

12. A programmable storage device readable by a machine tangibly embodying a program of instructions executable by said machine to perform method steps for displaying a structural view of a computer program on a monitor during a debugging session, said program applying within a computer system, said method steps comprising:

displaying a portion of a program call graph (PCG) on the monitor, wherein said PCG includes a P_node symbolically representing a first procedure and a procedure relationship symbolically representing a calling association from said first procedure to a second procedure;

determining a condition for said first procedure while executing the computer program; and updating the display on the monitor to mark said P_node based on said condition into a marked B_node, wherein said marked P_node is visually distinguishable from said P_node.

13. The programmable storage device of claim 12, wherein said condition is taken from the group consisting of an execution state, an execution frequency and an execution age, wherein said execution state corresponds to either said first procedure having been executed or said first procedure being nonexecuted, wherein said execution frequency is a rate of said first procedure being executed, and wherein said execution age is a time interval since said first procedure has been executed.

14. The programmable storage device of claim 12, wherein said marked P_node has an altered symbolic attribute from an unaltered P_node, wherein said symbolic attribute is taken from the group consisting of shade, highlight, color, border thickness, symbol size, symbol shape, and alternation of a visual characteristic.

15. The programmable storage device of claim 12, wherein said method steps further comprise:

creating a list of a plurality of PCG procedures from said portion of said PCG; and recording said list of said plurality of PCG procedures onto a memory, said memory being retrievable.

16. A programmable storage device readable by a machine tangibly embodying a program of instructions executable by said machine to perform method steps for displaying a structural view of a computer program on a monitor during a debugging session, said program applying within a computer system, said method steps comprising:

displaying a portion of a control flow graph (CFG) on the monitor, wherein said CFG includes a B_node symbolically representing a first basic block and a basic block relationship symbolically representing a calling association from said first basic block to a second basic block;

determining a condition for said first basic block while executing the computer program; and updating the display on said monitor to said marked B_node based on said condition into a marked B_node, wherein said marked B_node is visually distinguishable from said B_node.

17. The programmable storage device of claim 16, wherein said method steps further comprise:

displaying within said B_node a line number associated with a source code statement of the computer program.

18. The programmable storage device of claim 16, wherein said condition is taken from the group consisting of an execution state, an execution frequency and an execution age, wherein said execution state corresponds to either said first procedure having been executed or said first procedure being nonexecuted, wherein said execution frequency is a rate of said first procedure being executed, and wherein said execution age is a time interval since said first procedure has been executed.

19. The programmable storage device of claim 18, wherein said marked B_node has an altered symbolic attribute from an unaltered B_node, wherein said symbolic attribute is taken from the group consisting of shade, highlight, color, border thickness, symbol size, symbol shape, and alternation of a visual characteristic.

20. The programmable storage device of claim 16, further comprising:

creating a list of a plurality of CFG instructions from said portion of said CFG; and recording said list of said plurality of CFG instructions onto a memory, said memory being retrievable.

21. A debugger for displaying a structural view of a computer program on a monitor during a debugging session, said debugger operating within a computer system, said debugger comprising:

a displayer for displaying a portion of a program call graph (PCG) on the monitor, wherein said PCG includes a P_node symbolically representing a first procedure and a procedure relationship symbolically representing a calling association from said first procedure to a second procedure;

a condition determiner for determining a condition for said first procedure while executing the computer program; and an updater for updating the display on the monitor to mark said P_node based on said condition into a marked P_node, wherein said marked P_node is visually distinguishable from said P_node.

22. The debugger of claim 21, wherein said condition is taken from the group consisting of an execution state, an execution frequency and an execution age, wherein said execution state corresponds to either said first procedure having been executed or said first procedure being nonexecuted, wherein said execution frequency is a rate of said first procedure being executed, and wherein said execution age is a time interval since said first procedure has been executed.

23. The debugger of claim 21, wherein said marked P_node has an altered symbolic attribute from an unaltered P_node, wherein said symbolic attribute is taken from the group consisting of shade, highlight, color, border thickness, symbol size, symbol shape, and alternation of a visual characteristic.

24. The debugger of claim 21, further comprising:

a lister for producing a list of a plurality of PCG procedures from said portion of said PCG; and a recorder for recording said list of said plurality of PCG procedures onto a memory, said memory being retrievable.

25. A debugger for displaying a structural view of a computer program on a monitor during a debugging session, said debugger operating within a computer system, said debugger comprising:

a displayer for displaying a portion of a control flow graph (CFG) on the monitor, wherein said CFG includes a B-node symbolically representing a first basic block and a basic block relationship symbolically representing a calling association from said first basic block to a second basic block;

a condition determiner for determining a condition for said first basic block while executing the computer program; and an updater for updating the display on the monitor said B_node based on said condition into a marked B_node, wherein said marked B_node is visually distinguishable from said B_node.

26. The debugger of claim 25, further comprising:
a line number displayer for displaying within said B-node a line number associated with a source code statement of the computer program.

27. The debugger of claim 26, further comprising:
a statement displayer for displaying within said B-node a portion of said source code statement.

28. The debugger of claim 27, wherein said portion of said source code statement can be alternately toggled for one of either displaying said source code statement or displaying said portion of said source code statement.

29. The debugger of claim 25, wherein said marked B_node has an altered symbolic attribute from an unaltered B_node, wherein said symbolic attribute is taken from the group consisting of shade, highlight, color, border thickness, symbol size, symbol shape, and alternation of a visual characteristic.

30. The debugger of claim 25, wherein said condition is taken from the group consisting of an execution state, an execution frequency and an execution age, wherein said execution state corresponds to either said first procedure having been executed or said first procedure being nonexecuted, wherein said execution frequency is a rate of said first procedure being executed, and wherein said execution age is a time interval since said first procedure has been executed.

31. The debugger of claim 30, further comprising:
a lister for producing a list of a plurality of CFG instructions from said portion of said CFG; and
a recorder for recording said list of said plurality of CFG instructions onto a memory, said memory being retrievable.

* * * * *